(12) United States Patent
Asada

(10) Patent No.: US 6,950,673 B2
(45) Date of Patent: Sep. 27, 2005

(54) CELLULAR PHONE TERMINAL AND INTERMITTENT RECEPTION CONTROL METHOD TO BE USED IN A CELLULAR PHONE TERMINAL

(75) Inventor: Hideaki Asada, Tokyo (JP)

(73) Assignee: NEC Corporation, Tokyo (JP)

( * ) Notice: Subject to any disclaimer, the term of this patent is extended or adjusted under 35 U.S.C. 154(b) by 396 days.

(21) Appl. No.: 10/211,533

(22) Filed: Aug. 5, 2002

(65) Prior Publication Data

US 2003/0045323 A1 Mar. 6, 2003

(30) Foreign Application Priority Data

Sep. 5, 2001 (JP) ........................................ 2001-268163

(51) Int. Cl.$^7$ .......................... H04M 1/00; H04B 15/00; H04B 17/00
(52) U.S. Cl. ................................. 455/550.1; 455/67.11; 455/226.1; 455/502
(58) Field of Search .......................... 455/67.11, 343.1, 455/343.2, 343.4, 226.1, 226.2, 227, 230–231, 550.1, 574; 374/170–171, 141; 341/155–156, 158, 164–165; 370/311

(56) References Cited

U.S. PATENT DOCUMENTS

| | | | | |
|---|---|---|---|---|
| 5,315,301 A | * | 5/1994 | Hosotani et al. | 341/94 |
| 5,428,357 A | * | 6/1995 | Haab et al. | 341/155 |
| 5,619,430 A | * | 4/1997 | Nolan et al. | 702/63 |
| 5,778,311 A | * | 7/1998 | Nakanishi | 455/343.4 |
| 5,790,941 A | * | 8/1998 | Peponides | 455/87 |
| 5,815,819 A | * | 9/1998 | Ohta et al. | 455/574 |
| 5,991,635 A | * | 11/1999 | Dent et al. | 455/517 |
| 6,049,708 A | * | 4/2000 | Tsujita | 455/334 |
| 6,088,409 A | * | 7/2000 | Naruse | 375/354 |
| 6,088,576 A | * | 7/2000 | Sone | 340/7.33 |
| 6,480,476 B1 | * | 11/2002 | Willars | 370/311 |
| 6,574,200 B1 | * | 6/2003 | Tsumura | 370/311 |
| 6,725,067 B1 | * | 4/2004 | Marx et al. | 455/574 |

FOREIGN PATENT DOCUMENTS

| | | | | |
|---|---|---|---|---|
| EP | 0 858 169 A2 | | 1/1998 | |
| JP | 09018405 A | * | 1/1997 | ............ H04B/7/26 |
| JP | 10094019 A | * | 4/1998 | ............ H04Q/7/18 |
| JP | 2000013269 A | * | 1/2000 | ............ H04B/1/26 |
| JP | 2000-36770 | | 2/2000 | |
| JP | 2000-244351 | | 9/2000 | |

* cited by examiner

Primary Examiner—William Trost
Assistant Examiner—Meless Zewdu
(74) Attorney, Agent, or Firm—McGinn & Gibb, PLLC

(57) ABSTRACT

A cellular phone terminal can eliminate extra process and save power to be consumed. The cellular phone terminal includes a low speed clock circuit generating a low speed clock to be used for generating a low speed clock used for generation of a preliminarily set intermittent reception cycle, and a high speed clock circuit generating a high speed clock required at least for receiving operation and stopped during periods other than a period of receiving operation, and performing at least checking of incoming call and measurement of a reception level according to said intermittent reception cycle. The terminal also includes an analog/digital converting circuit for converting a measured value of conditional variation in own terminal into the digital signal, an averaging circuit for averaging a result of measurement using said analog/digital converting circuit, and a control circuit for controlling said analog/digital converting circuit and said averaging circuit adapting to said intermittent reception cycle.

23 Claims, 8 Drawing Sheets

CELLULAR PHONE TERMINAL AND INTERMITTENT RECEPTION CONTROL METHOD TO BE USED IN A CELLULAR PHONE TERMINAL

BACKGROUND OF THE INVENTION

1. Field of the Invention

The present invention relates generally to a cellular phone terminal and an intermittent reception control method to be used in the same. More particularly, the invention relates to an intermittent reception control system in a cellular phone terminal.

2. Description of the Related Art

Conventionally, in the cellular phone terminal, communication with a base station is performed by exchanging sub-frames, each consisted of a reception period (paging channel), an idling period and a transmission period. In the reception period, transmission of information necessary in the transmission period to the base station is performed in conjunction with reception of signal from the base station.

On the other hand, when the cellular phone terminal is placed into waiting condition, instead of sequentially receiving the signals from the base station at every reception period, operation to receive signals from the base station at only necessary reception period is repeated. Namely, the operation, in which when reception is performed at certain reception period, reception of the signal from the base station is not performed for a predetermined period, and next reception of the signal from the base station is performed at the next desired reception period, is repeated.

In case of the condition where reception of the signal from the base station is not performed, supply of a high speed clock for operating enabling operation of the cellular phone terminal is stopped and low speed clock is supplied to lower power consumption of the cellular phone terminal. Accordingly, next desired reception period is determined on the basis of result of counting of the low speed clock.

However, since the high speed clock and the low speed clock are supplied independently, these two clocks are not synchronized with each other to cause phase shift therebetween.

In order to solve this problem, in the technology disclosed in Japanese Unexamined Patent Publication No. 2000-36770, a frequency difference and phase difference of the high speed clock and the low speed clock are detected respectively to transit to the next desired reception period at a timing reflecting those frequency difference and the phase difference.

On the other hand, in the technology disclosed in Japanese Unexamined Patent Publication No. 2000-244351, in order to lower power consumption in the cellular phone terminal in waiting state, a temperature compensated crystal oscillator (TCXO) providing high precision clock for accurately receiving the signal is stopped to use only system clock constantly operating to driving a man-machine interface.

In the foregoing conventional cellular phone terminal, it is required to lower power consumption for expanding waiting period, and power consumption has been reduced by the methods set forth above. However, in case of the cellular phone terminal employing a Code Division Multiple Access (CDMA) system or the like, reception process is complicate to require reduction of process amount of a central processing unit (CPU) for enhancing process efficiency to realize saving of power consumption.

SUMMARY OF THE INVENTION

The present invention has been worked out the problems set forth above. Therefore, it is an object of the present invention to provide a cellular phone terminal which can eliminate extra process and whereby save power to be consumed, an intermittent reception control method to be used therefor.

According to the first aspect of the present invention, a cellular phone terminal including a low speed clock circuit generating a low speed clock to be used for generating a low speed clock used for generation of a preliminarily set intermittent reception cycle, and a high speed clock circuit generating a high speed clock required at least for receiving operation and stopped during periods other than a period of receiving operation, and performing at least checking of incoming call and measurement of a reception level according to said intermittent reception cycle, comprises:

an analog/digital converting circuit for converting a measured value of conditional variation in own terminal into the digital signal;

an averaging circuit for averaging a result of measurement using said analog/digital converting circuit; and a control circuit for controlling said analog/digital converting circuit and said averaging circuit adapting to said intermittent reception cycle.

According to the second aspect of the present invention, an intermittent reception control methods of a cellular phone terminal including a low speed clock circuit generating a low speed clock to be used for generating a low speed clock used for generation of a preliminarily set intermittent reception cycle, and a high speed clock circuit generating a high speed clock required at least for receiving operation and stopped during periods other than a period of receiving operation, and performing at least checking of incoming call and measurement of a reception level according to said intermittent reception cycle, comprising:

step of controlling an analog/digital converting circuit for converting a measured value of conditional variation in own terminal and an averaging circuit for averaging a result of measurement using said analog/digital converting circuit adapting to said intermittent reception cycle.

Namely, the cellular phone terminal according to the present invention can reduce process amount of CPU in the intermittent receiving operation by automatically performing process necessary for intermittent receiving operation, and whereby can save power to be consumed.

As set forth above, the present invention efficiently perform necessary measurement within a period necessary for receiving process and can eliminate extra process by performing process of CPU only as required for saving power to be consumed.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of a cellular phone terminal, an intermittent reception method therefor and a program thereof in accordance with the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structure is not shown in detail in order to avoid unnecessary obscurity of the present invention.

Figure 1:
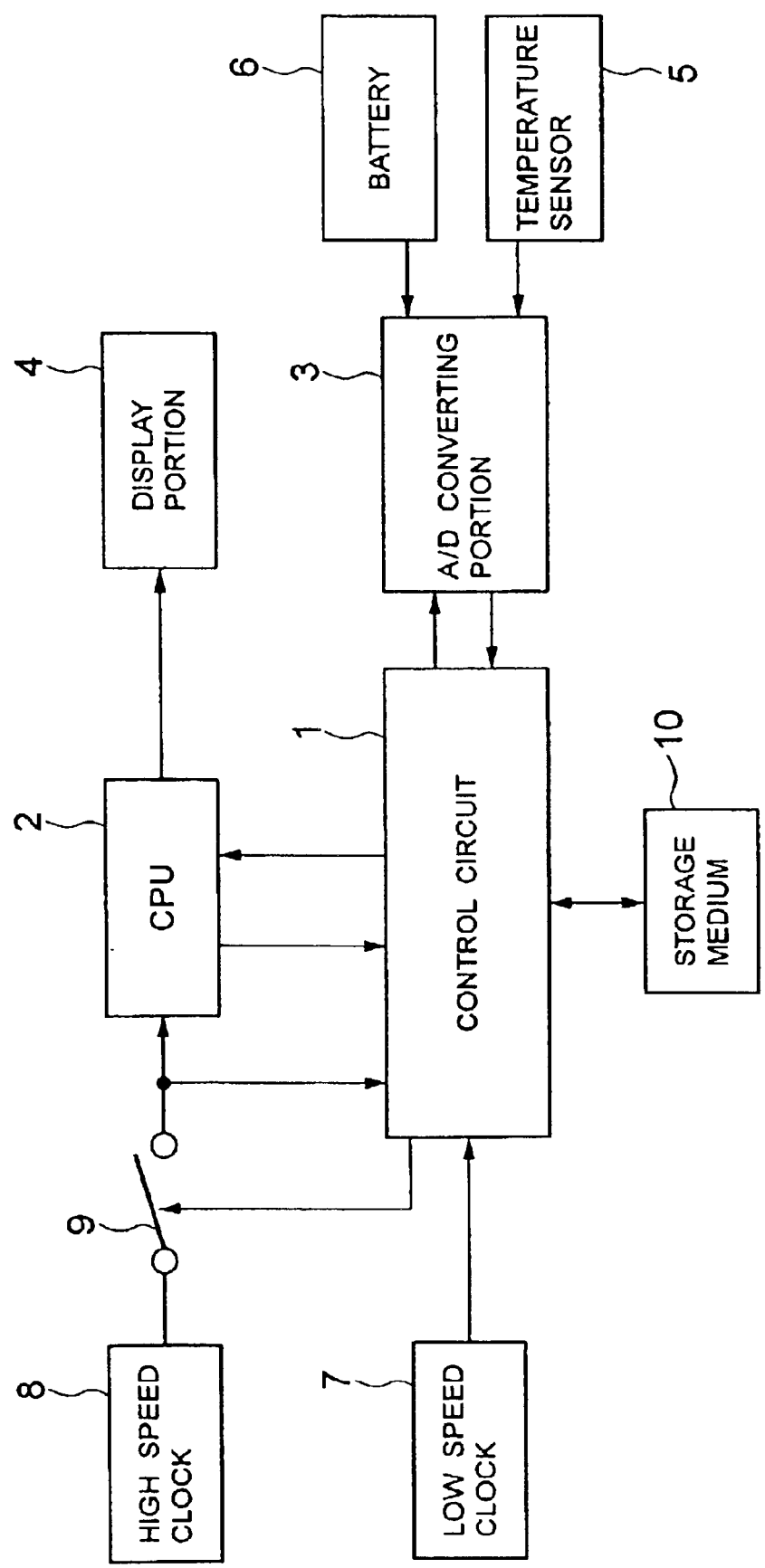
FIG. 1 is a block diagram showing a construction of one embodiment of a cellular phone terminal according to the present invention.

FIG. 1 is a block diagram showing a construction of one embodiment of a cellular phone terminal according to the present invention. In FIG. 1, one embodiment of a cellular phone terminal according to the present invention is constructed with a control circuit 1, a CPU 2, an A/D (analog/digital) converter 3, a display portion 4, a temperature sensor 5, a battery 6, a low speed clock circuit 7, a high speed clock circuit 8, a switch 9 and a storage medium 10.

CPU 2 performs receiving operation such as checking of incoming call, measurement of reception level and so force and calling operation to a call destination and so forth on the basis of a high speed clock from a high speed clock circuit 8. Information required at this time is displayed on a display portion 4.

The A/D converter 3 measures voltages of a temperature sensor 5 and a battery 6 and transmits measured values to the control circuit 1. The control circuit 1 uses a low speed clock from the low speed clock circuit 7 and a high speed clock from the high speed clock circuit 8, measures a frequency difference between the high speed clock from the high speed clock circuit 8 and the low speed clock from the low speed clock circuit 7 to generate an intermittent reception timing. With the generated timing, control of ON/OFF of the high speed clock circuit 8, triggering of initiation of an A/D conversion, triggering of initiation of counting of the frequency difference and so forth are performed. In this case, the control circuit 1 performs foregoing control by executing a program stored in the storage medium 10.

Figure 2:
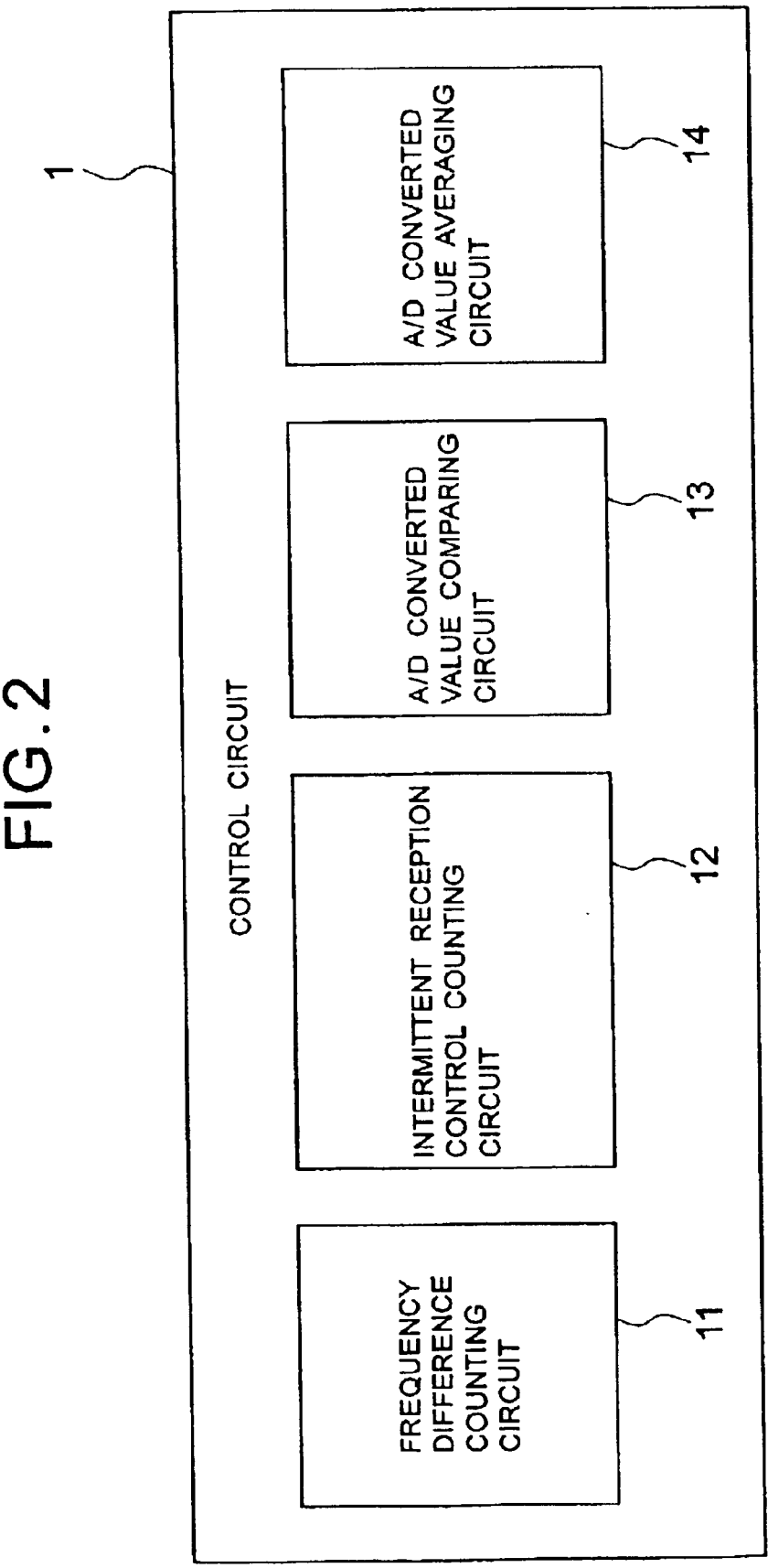
FIG. 2 is a block diagram showing a construction of a control circuit of FIG. 1.

FIG. 2 is a block diagram showing a construction of the control circuit 1 of FIG. 1. In FIG. 2, the control circuit 1 is constructed with a frequency difference counting circuit 11, an intermittent reception control counting circuit 12, an A/D converted value comparing circuit 13 and an A/D converted value averaging circuit 14. In the alternative, these circuits may be realized by programs stored in the storage medium 10.

The frequency difference counting circuit 11 is a circuit for calculating a frequency difference between the high speed clock from the high speed clock circuit 8 and the low speed clock from the low speed clock circuit 7. The intermittent reception control counting circuit 12 performs timing generation of the intermittent reception, and control of ON/OFF (ON/OFF of the switch 9) of the high speed clock circuit 8 at the generated timing, triggering of initiation of the A/D conversion and triggering of initiation of counting of the frequency difference and so forth.

The A/D conversion value averaging circuit 14 reads out a voltage value of a temperature sensor 5 digital converted by the A/D converter 3 and a voltage value (A/D converted value) of the battery 6 and performs averaging process for the voltage values. The A/D converted value comparing circuit 13 compares the value set from the CPU 2 and the A/D converted value read in the A/D converted value averaging circuit 14 to notify the result of comparison to CPU 2 or the intermittent reception control counting circuit 12.

Figure 5:
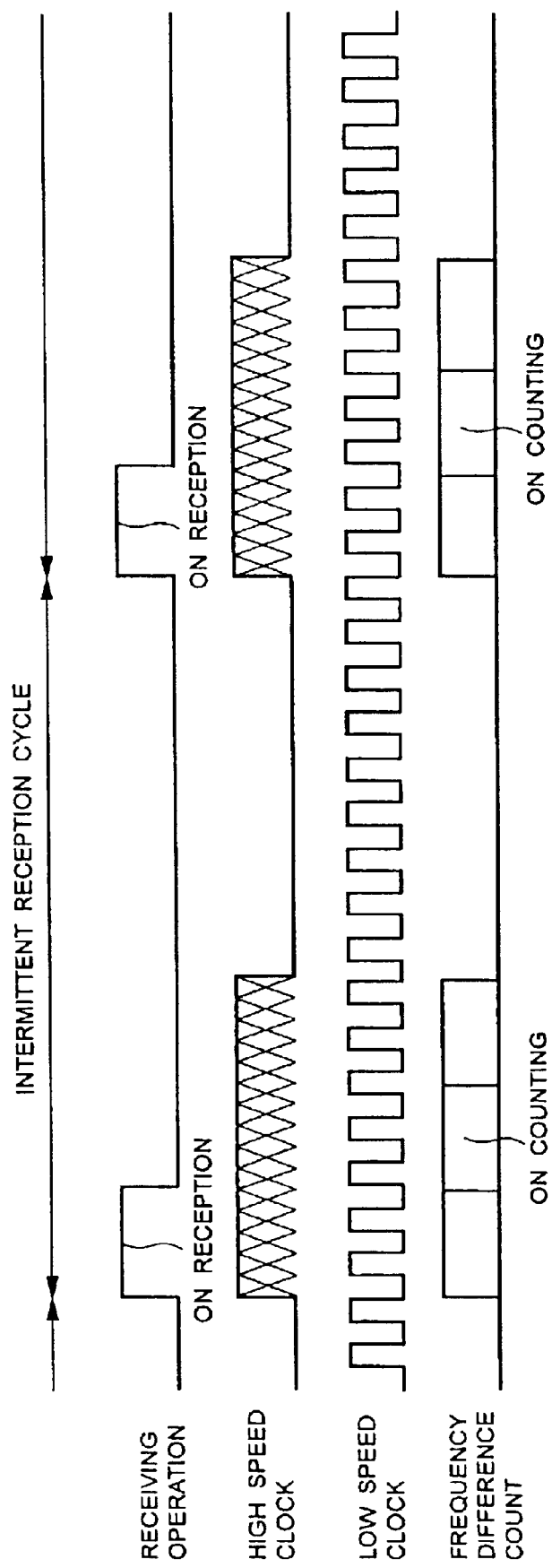
FIG. 5 is a timing chart showing operation in an intermittent reception of one embodiment of the cellular phone terminal according to the present invention.
Figure 6:
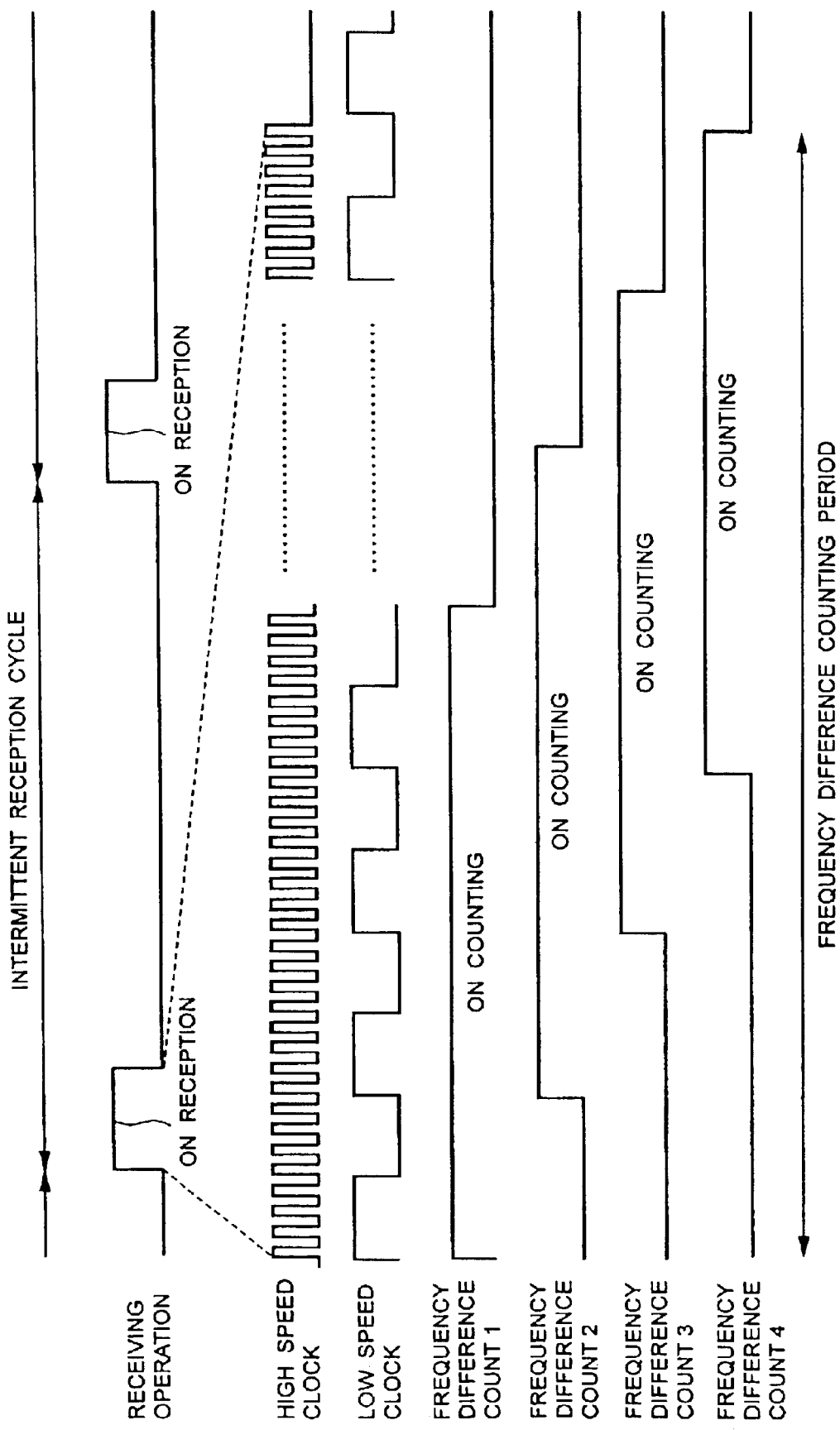
FIG. 6 is a timing chart showing operation in an intermittent reception of one embodiment of the cellular phone terminal according to the present invention.
Figure 7:
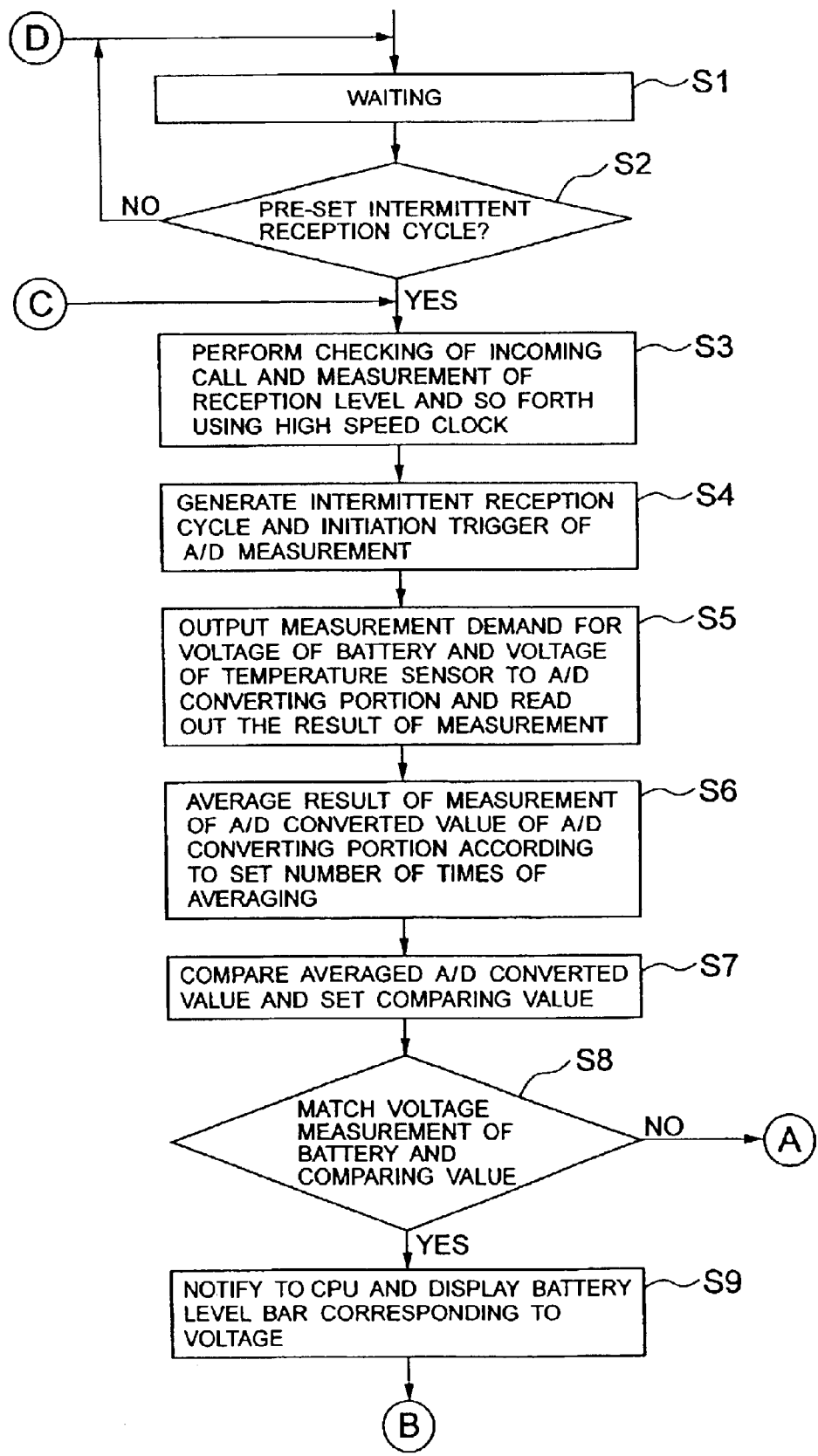
FIG. 7 is a flowchart showing operation in an intermittent reception of one embodiment of the cellular phone terminal according to the present invention.
Figure 8:
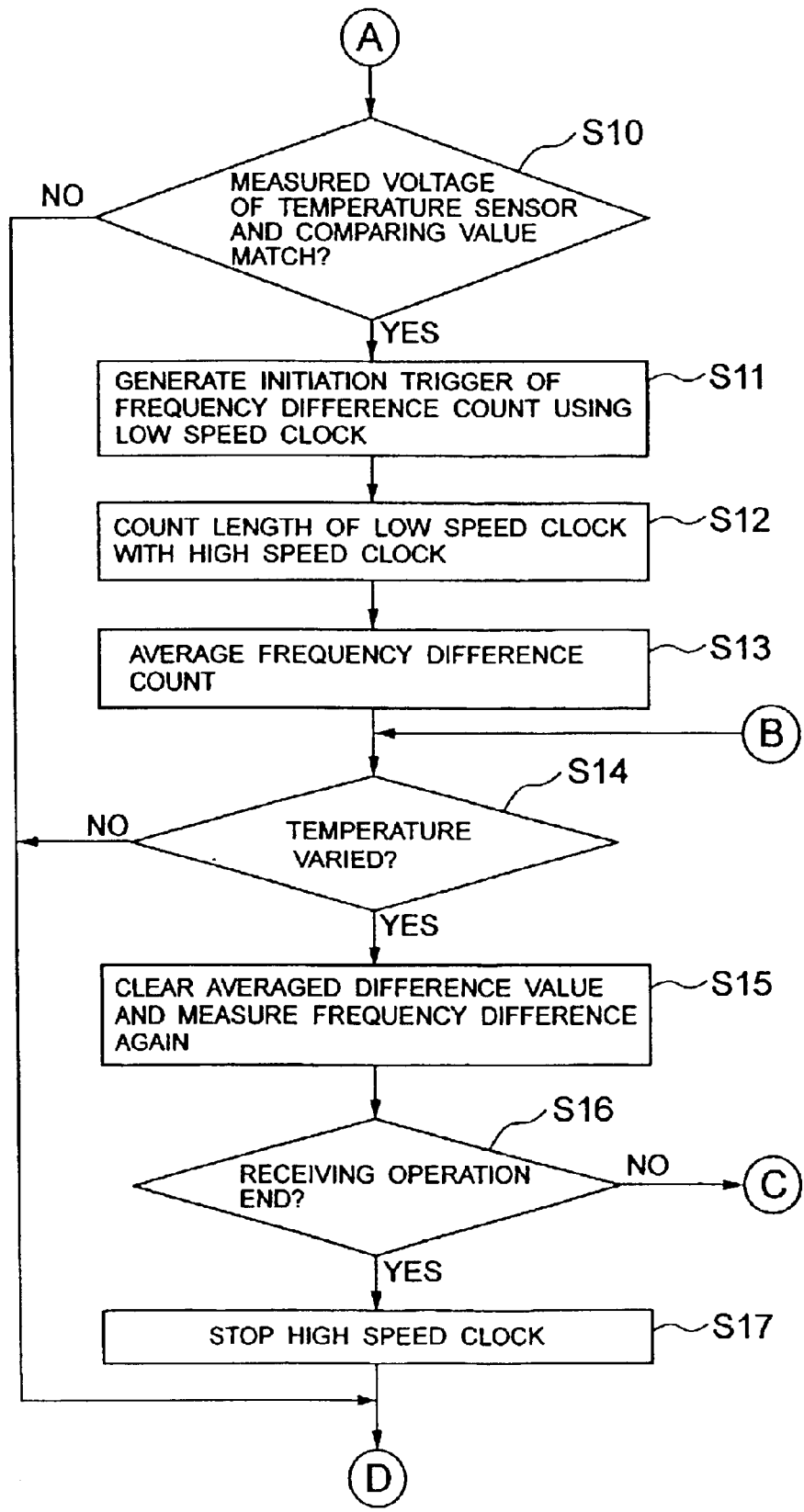
FIG. 8 is a flowchart showing operation in an intermittent reception of one embodiment of the cellular phone terminal according to the present invention.

FIGS. 3 to 6 are timing charts showing operation upon intermittent reception in one embodiment of the cellular phone terminal according to the present invention and FIGS. 7 and 8 are flowcharts showing operation upon intermittent reception of one embodiment of the cellular phone terminal according to the present invention. Operation of one embodiment of the cellular phone terminal according to the present invention will be discussed with reference to FIGS. 1 to 8. It should be noted that the process operation shown in FIGS. 7 and 8 are realized by the control circuit 1 executing the program stored on the storage medium 10.

Figure 3:
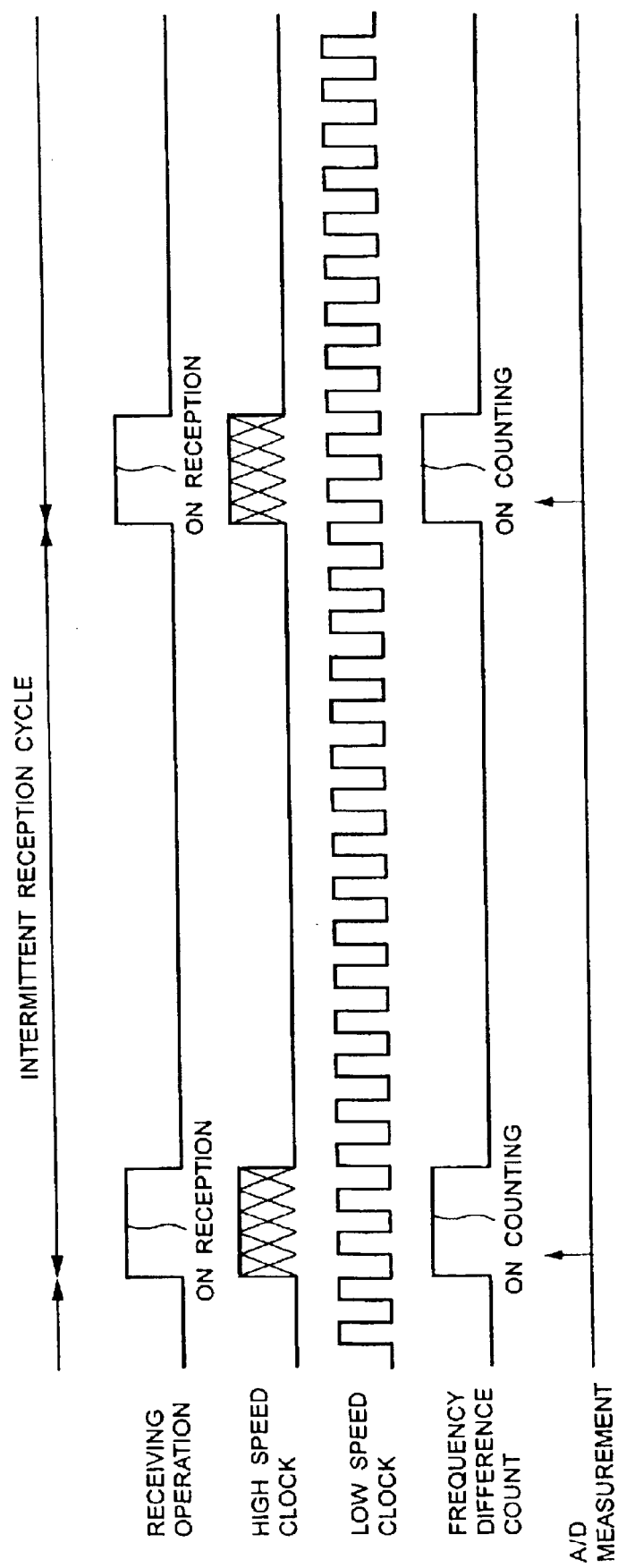
FIG. 3 is a timing chart showing operation in an intermittent reception of one embodiment of the cellular phone terminal according to the present invention.
Figure 4:
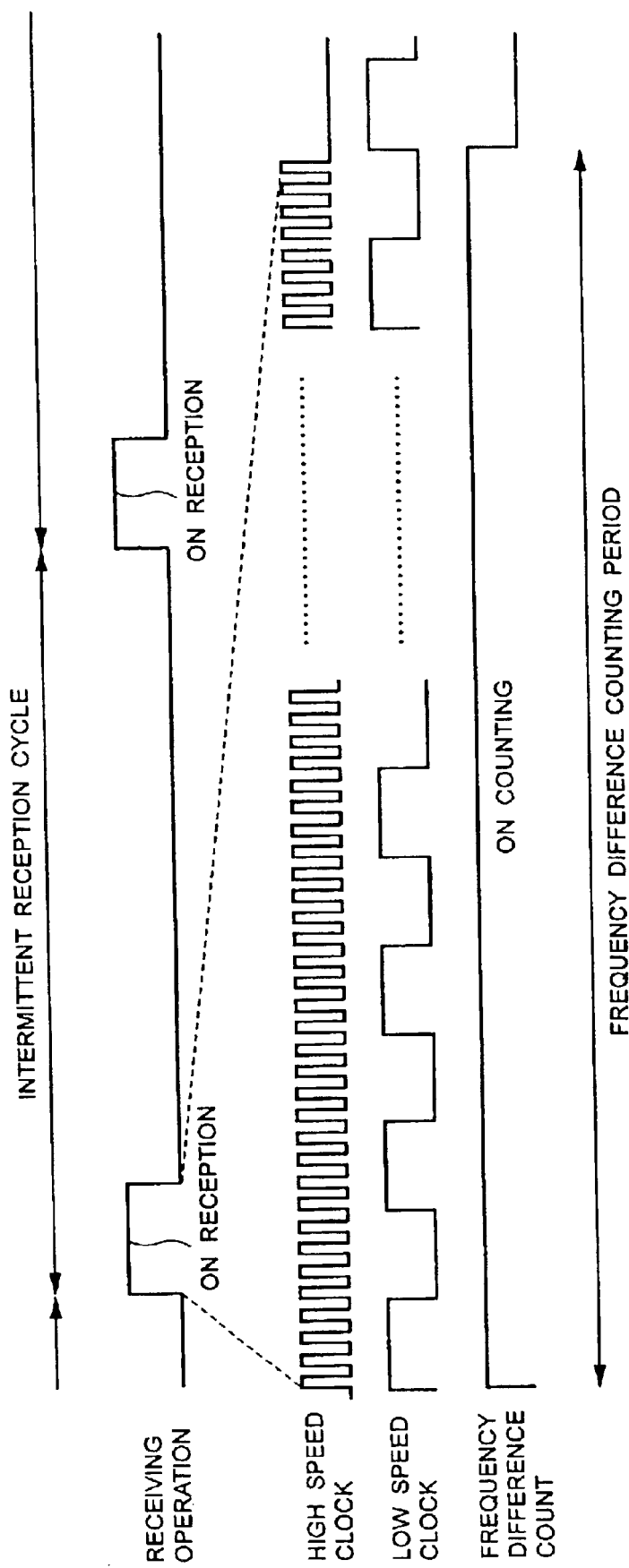
FIG. 4 is a timing chart showing operation in an intermittent reception of one embodiment of the cellular phone terminal according to the present invention.

As shown in FIG. 3, while the cellular phone terminal is in waiting state (step S1 of FIG. 7), incoming call is checked according to the preliminarily set intermittent reception cycle in the cellular phone terminal to perform measurement of the reception level (steps S2 and S3 of FIG. 7). The intermittent reception cycle is generated in the intermittent reception control counting circuit 12 using the low speed clock from the low speed clock circuit 7 (step S4 of FIG. 7).

The low speed clock from the low speed clock circuit 7 is the clock necessary for time display to be displayed on the cellular phone terminal in addition to generation of the intermittent reception cycle. In contrast to this, the high speed clock from the high speed clock circuit 8 is the clock necessary for receiving operation and necessary for operation of CPU 2. In conjunction with termination or end of those operations (step S16 of FIG. 8), the high speed clock is stopped by the intermittent reception control counting circuit 12 (step S17 of FIG. 8).

The A/D measurement and the frequency difference counting are performed during receiving operation. An initiation trigger of the A/D measurement is generated in the intermittent reception control counting circuit 12 using the low speed clock from the low speed clock circuit 7 (step S4 of FIG. 7). In this case, the initiation trigger of the A/D measurement is set to perform A/D measurement during receiving operation.

The A/D converted value averaging circuit 14 receiving the initiation trigger of the A/D measurement issues a measurement demand for the voltage of the battery 6 and the voltage of the temperature sensor 5, to the A/D converting portion 3, to read out the result of measurement (step S5 of FIG. 7). The A/D converted value averaging circuit 14 performs averaging of the measurement result of the A/D converted value of the A/D converting portion 3 in accordance with averaging times set from CPU 2 and notifies to the A/D converted value comparing circuit 13 (step S6 of FIG. 7).

In the A/D converted value comparing circuit 13, the notified A/D converted value is compared with a comparing value set from CPU 2 to issue a notice when the A/D converted value becomes equal to the comparing value (step S7 of FIG. 7). When the measured value in voltage measurement of the battery 6 becomes equal to the comparing value (step S8 of FIG. 7), the A/D converted value comparing circuit 13 performs notice to CPU 2. Then, CPU 2 makes judgment that the voltage of the battery 6 is varied, a battery level bar corresponding to the voltage is displayed on the display portion 4.

On the other hand, when the measured value in voltage measurement of the temperature sensor 5 becomes equal to the comparing value (step S10 of FIG. 8), the A/D converted value comparing circuit 13 performs notice to the intermittent reception control counting circuit 12. On the basis of this notice, the intermittent reception control counting circuit 12 generates the initiation trigger of the frequency difference count using the low speed clock from the low speed clock circuit 7 (step S11 of FIG. 8).

The frequency difference counting circuit 11 receiving the initiation trigger of frequency difference counting counts a length of the low speed clock from the low speed clock circuit 7 by the high speed clock circuit 8 (step S12 of FIG. 8). Since the low speed clock circuit 7 varies frequency depending upon temperature variation or the like, a difference value of the frequency can be calculated by number of count in the high speed clock circuit 8. The temperature sensor 5 detects temperature variation of own terminal in order to detect frequency variation of the low speed clock circuit 7.

The frequency difference counting period is variable so that the period ends during receiving operation. Counting of the frequency difference is performed at every intermittent reception cycle. The counter value is averaged in the frequency difference counting circuit 11 (step S13 of FIG. 8). By using the difference value averaged in the frequency difference counting circuit 11, receiving operation is certainly performed constantly avoiding deviation of intermittent reception cycle.

When variation of the temperature is detected by the A/D converted value comparing circuit 13 (step S14 of FIG. 8), temperature variation is notified to the intermittent reception control counting circuit 12. Then, the difference value averaged in the frequency difference counting circuit 11 is cleared. At the same time, the frequency difference counting circuit 11 performs measurement of the difference value again (step S15 of FIG. 8). When precision of the frequency difference is required, the frequency difference counting circuit 11 repeats measurement for several times as shown in FIGS. 5 and 6.

In the method shown in FIG. 5, even when receiving operation is completed, the high speed clock circuit 8 is not stopped so as to repeat measurement until re-measurement of the frequency difference is completed. In the method shown in FIG. 6, a plurality of counting circuits (not shown) are employed to perform frequency difference count (frequency difference count 1 to 4 in FIG. 6) in parallel with shifting timing.

As set forth above, since the operation of A/D conversion, averaging and comparison of the result are performed automatically upon performing intermittent reception, CPU 2 may be operated only as required, and extra process can be eliminated. Calculation of the frequency difference is also performed automatically. On the other hand, re-measurement is performed automatically in response to temperature variation to maintain intermittent reception cycle using the most recent difference value.

By employing the counting method of the frequency difference shown in FIG. 6, the difference value can be derived with high precision in a short period. On the other hand, by automating the A/D conversion and calculation of the frequency difference, extra process can be eliminated to save the power to be consumed.

While discussion has been made in connection with measurement of the voltage of the battery 6 and the voltage of the temperature sensor 5 in the A/D converting portion 3 of FIG. 1, the foregoing control method of intermittent reception may be applicable for measurement of A/D conversion of other sensor, such as the optical sensor (not shown).

On the other hand, while the A/D converted value comparing circuit 13 of FIG. 2 is the circuit to issue a notice when the value equal to the value set from the CPU 2 of FIG. 1, it is also possible to notify when the measured value is varied in the extent corresponding to a value set by CPU 2.

As set forth above, the present invention achieves elimination of extra process and saving of power to be consumed in the cellular phone terminal having the low speed clock circuit generating the low speed clock to be used for generation of the preliminarily set intermittent reception cycle and the high speed clock circuit generating the high speed clock necessary at least for receiving operation and stopping generation in periods other than receiving operation, and performing at least checking of incoming call and measurement of reception level according to the intermittent reception cycle by controlling the A/C converting circuit for converting the measured value of conditional variation in own terminal and the averaging circuit for averaging the result of measurement using the A/D converting circuit.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A cellular phone terminal, comprising:
    a low speed clock circuit for generating a low speed clock signal to be used for generation of an intermittent reception cycle;
    a high speed clock circuit for generating a high speed clock signal for a receiving operation, the high speed clock signal being stopped during periods other than a period of the receiving operation, and for checking for an incoming call and measurement of a reception level based on said intermittent reception cycle;
    an analog/digital converting circuit for converting a measured value of conditional variation in said cellular phone terminal into a digital signal;
    an averaging circuit for averaging the converted measured value from said analog/digital converting circuit;

a control circuit for controlling said analog/digital converting circuit and said averaging circuit based on said intermittent reception cycle; and a comparing circuit for comparing the converted measured value from said analog/digital converting circuit with a predetermined value, wherein said control circuit controls said analog/digital converting circuit and said averaging circuit depending upon a result of comparison by said comparing circuit.

2. A cellular phone terminal as set forth in claim 1, which further comprises:

a temperature sensor for detecting a temperature variation of said cellular phone terminal, wherein:

a measured value of said temperature sensor is converted into said digital signal by said analog/digital converting circuit, and when a temperature variation is detected by said comparing circuit, counting of the frequency difference between said high speed clock signal and said low speed clock signal is performed.

3. A cellular phone terminal, comprising:

a low speed clock circuit for generating a low speed clock signal to be used for generation of an intermittent reception cycle;

a high speed clock circuit for generating a high speed clock signal for a receiving operation, the high speed clock signal being stopped during periods other than a period of the receiving operation, and for checking for an incoming call and measurement of a reception level based on said intermittent reception cycle;

an analog/digital converting circuit for converting a measured value of conditional variation in said cellular phone terminal into a digital signal;

an averaging circuit for averaging the converted measured value from said analog/digital converting circuit; and a control circuit for controlling said analog/digital converting circuit and said averaging circuit based on said intermittent reception cycle, wherein said control circuit controls counting of a frequency difference between said high speed clock signal and said low speed clock signal based on said intermittent reception cycle.

4. A cellular phone terminal as set forth in claim 3, wherein a counting period of said frequency difference is based on said intermittent reception cycle.

5. A cellular phone terminal as set forth in claim 3, wherein said counting of said frequency difference is performed using said high speed clock signal.

6. A cellular phone terminal as set forth in claim 3, wherein said high speed clock circuit continues to operate so as to repeat measurement until re-measurement of said frequency difference is completed, even when the receiving operation is completed.

7. A cellular phone terminal as set forth in claim 3, further comprising a plurality of counting circuits in parallel for counting said frequency difference, said counting circuits having a time shift.

8. A cellular phone terminal as set forth in claim 3, further comprising a frequency difference counting circuit for counting the frequency difference.

9. An intermittent reception control method for a cellular phone terminal including a low speed clock circuit which generates a low speed clock signal to be used for generation of an intermittent reception cycle, and a high speed clock circuit which generates a high speed clock signal for a receiving operation, the high speed clock signal being stopped during periods other than a period of the receiving operation, and for checking for an incoming call and measurement of a reception level based on said intermittent reception cycle, said method comprising:

controlling an analog/digital converting circuit to convert a measured value of a conditional variation in said cellular phone terminal into a digital signal;

controlling an averaging circuit to average the converted measured value from said analog/digital converting circuit based on said intermittent reception cycle;

comparing the converted measured value from said analog/digital converting circuit with a predetermined value; and controlling said analog/digital converting circuit and said averaging circuit based on a result of comparison by said comparing circuit.

10. An intermittent reception control method as set forth in claim 9, wherein a measured value of a temperature sensor which detects a temperature variation of said cellular phone terminal is converted into said digital signal by said analog/digital converting circuit, and when a temperature variation is detected by said comparing circuit, counting of the frequency difference between said high speed clock signal and said low speed clock signal is performed.

11. An intermittent reception control method for a cellular phone terminal including a low speed clock circuit which generates a low speed clock signal to be used for generation of an intermittent reception cycle, and a high speed clock circuit which generates a high speed clock signal for a receiving operation, the high speed clock signal being stopped during periods other than a period of the receiving operation, and for checking for an incoming call and measurement of a reception level based on said intermittent reception cycle, said method comprising:

controlling an analog/digital converting circuit to convert a measured value of a conditional variation in said cellular phone terminal into a digital signal;

controlling an averaging circuit to average the converted measured value from said analog/digital converting circuit based on said intermittent reception cycle; and controlling counting of a frequency difference between said high speed clock and said low speed clock based on said intermittent reception cycle.

12. An intermittent reception control method as set forth in claim 11, wherein a counting period of said frequency difference is based on said intermittent reception cycle.

13. An intermittent reception control method as set forth in claim 11, wherein said counting of said frequency difference is performed using said high speed clock signal.

14. An intermittent reception control method as set forth in claim 11, wherein said high speed clock circuit continues to operate so as to repeat measurement until re-measurement of said frequency difference is completed, even when the receiving operation is completed.

15. An intermittent reception control method as set forth in claim 11, wherein counting of said frequency difference is performed in parallel by a plurality of counting circuits with a time shift.

16. An intermittent reception control method for a cellular phone terminal including a first speed clock circuit which generates a first speed clock signal to be used for generation of an intermittent reception cycle, and a second speed clock circuit which generates a second speed clock signal for a receiving operation, the second speed clock signal being stopped during periods other than a period of the receiving operation, and for checking for an incoming call and measurement of a reception level during said intermittent reception cycle, said method comprising:

converting a measured analog value of a conditional variation in said cellular phone terminal into digital signals;

averaging the digital signals based on said intermittent reception cycle;

comparing the averaged digital signals with a predetermined value; and controlling said converting of the measured analog values and said averaging of the digital signal base on the compared averaged digital signal.

17. An intermittent reception control method as set forth in claim 16, wherein the second speed clock signal has a higher speed than the first speed clock signal.

18. An intermittent reception control method as set forth in claim 16, wherein:

the measured analog value of a conditional variation in said cellular phone terminal comprises a temperature variation; and when the temperature variation is detected, counting of the frequency difference between said second speed clock signal and said first speed clock signal is performed.

19. An intermittent reception control method for a cellular phone terminal including a first speed clock circuit which generates a first speed clock signal to be used for generation of an intermittent reception cycle, and a second speed clock circuit which generates a second speed clock signal for a receiving operation, the second speed clock signal being stopped during periods other than a period of the receiving operation, and for checking for an incoming call and measurement of a reception level during said intermittent reception cycle, said method comprising:

converting a measured analog value of a conditional variation in said cellular phone terminal into digital signals;

averaging the digital signals based on said intermittent reception cycle; and counting a frequency difference between said high speed clock signal and said low speed clock signal during said intermittent reception cycle.

20. An intermittent reception control method as set forth in claim 19, wherein the second speed clock signal has a higher speed than the first speed clock signal.

21. An intermittent reception control method as set forth in claim 19, wherein a counting period of said frequency difference is based on said intermittent reception cycle.

22. An intermittent reception control method as set forth in claim 19, wherein said counting of said frequency difference is performed using said second speed clock signal.

23. An intermittent reception control method as set forth in claim 19, wherein counting of said frequency difference is performed in parallel by a plurality of counting circuits with a time shift.

* * * * *